United States Patent [19]
Munro et al.

[11] Patent Number: 6,026,175
[45] Date of Patent: Feb. 15, 2000

[54] CURRENCY DISCRIMINATOR AND AUTHENTICATOR HAVING THE CAPABILITY OF HAVING ITS SENSING CHARACTERISTICS REMOTELY ALTERED

[75] Inventors: Mark C. Munro, Park Ridge; Sanjay Shivde, Bensenville, both of Ill.

[73] Assignee: Cummins-Allison Corp., Mt. Prospect, Ill.

[21] Appl. No.: 08/722,808

[22] Filed: Sep. 27, 1996

[51] Int. Cl.⁷ ...................................................... G06K 9/78
[52] U.S. Cl. ............................ 382/135; 705/21; 209/534
[58] Field of Search ................................... 382/135, 137, 382/138, 139, 140; 235/379; 209/534; 705/21, 18; 194/207, 303

[56] References Cited

U.S. PATENT DOCUMENTS

| | | | |
|---|---|---|---|
| Re. 31,692 | 10/1984 | Tyburski et al. | 382/140 |
| D. 369,984 | 5/1996 | Larsen | D10/97 |
| 3,245,534 | 4/1966 | Smith et al. | 382/135 |
| 3,280,974 | 10/1966 | Riddle et al. | 209/111.8 |
| 3,480,785 | 11/1969 | Auderhiede | 250/219 |
| 3,496,370 | 2/1970 | Haville et al. | 250/219 |
| 3,509,535 | 4/1970 | Berube | 382/195 |
| 3,612,835 | 10/1971 | Andrews et al. | 235/440 D |
| 3,618,765 | 11/1971 | Cooper et al. | 209/534 |
| 3,679,314 | 7/1972 | Mustert | 356/71 |
| 3,778,628 | 12/1973 | Novak et al. | 250/556 |
| 3,842,281 | 10/1974 | Goodrich | 250/461 |
| 3,870,629 | 3/1975 | Carter et al. | 209/534 |

(List continued on next page.)

FOREIGN PATENT DOCUMENTS

| | | |
|---|---|---|
| 0077464 | 4/1983 | European Pat. Off. . |
| 101115 | 2/1984 | European Pat. Off. . |
| 0342647 | 11/1989 | European Pat. Off. . |
| 2190996 | 12/1987 | United Kingdom . |
| WO90/07165 | 6/1990 | WIPO . |
| WO91/11778 | 8/1991 | WIPO . |
| WO93/23824 | 11/1993 | WIPO . |
| WO94/19773 | 9/1994 | WIPO . |
| WO 95/24691 | 9/1995 | WIPO . |
| WO 96/10800 | 4/1996 | WIPO . |

OTHER PUBLICATIONS

Currency Systems International, CPS 1200; 4 pages; date: copyr. 1992.
Currency Systems International, Medium Speed Currency Sorting Family, CPS 600 and CPS 900; 4 pages;date: copyr. 1994.
Currency Systems International/Currency Processing Systems, CPS 300; 4 pages; date: copyr. 1992.
AFB Currency Recognition System (1982).
JetCount® Model 4020 Currency Counter Brochure (Apr. 1995).
JetScan Currency Scanner/Counter, Model 4060, Operator's Manual by Cummins–Allison (Aug. 1991).
JetScan Currency Scanner/Counter, Model 4061, Operating Instructions by Cummins–Allison (Apr. 20, 1993).
JetScan Currency Scanner/Counter, Model 4062, Operating Instructions by Cummins–Allison (Nov. 28, 1994).
Mosler CF–420 Cash Management System Operator's Manual, cover, copyright page, and chapter 5 pp. 5–1 through 5–16, copyrighted.
Mosler Inc. brochure "The Mosler/Toshiba CF–420", 1989.
RS–232C Communication, Musashi Corporation–International Operating Division (Apr. 05, 1988).

*Primary Examiner*—Jon Chang
*Attorney, Agent, or Firm*—Arnold White & Durkee

[57] ABSTRACT

A document handling system communicates with a host system such as a cash settlement machine. The operator of the host system enters the denomination of the notes to be counted by the note counting device. The host system then sends a signal to the document handling device to establish the denomination that is to be counted. The sensitivity level within the document handling device is set corresponding to the signal sent by the host. The document handling device then generates authenticity data from each of the plurality of notes and compares the authenticity data to the sensitivity level to determine whether each of the plurality of notes is genuine.

44 Claims, 6 Drawing Sheets

U.S. PATENT DOCUMENTS

| | | | |
|---|---|---|---|
| 3,906,449 | 9/1975 | Marchak | 340/540 |
| 3,976,198 | 8/1976 | Carnes, Jr. et al. | 209/534 |
| 4,041,456 | 8/1977 | Ott et al. | 382/135 |
| 4,081,131 | 3/1978 | Sand et al. | 235/419 |
| 4,096,991 | 6/1978 | Iguchi | 235/419 |
| 4,114,804 | 9/1978 | Jones et al. | 235/476 |
| 4,147,430 | 4/1979 | Gorgone et al. | 356/51 |
| 4,179,685 | 12/1979 | O'Maley | 382/135 |
| 4,255,651 | 3/1981 | Phillips | 377/8 |
| 4,277,774 | 7/1981 | Fujii et al. | 382/135 |
| 4,283,708 | 8/1981 | Lee | 382/135 |
| 4,288,781 | 9/1981 | Sellner et al. | 382/135 |
| 4,302,781 | 11/1981 | Ikeda et al. | 358/486 |
| 4,311,914 | 1/1982 | Huber | 250/556 |
| 4,334,619 | 6/1982 | Horino et al. | 209/551 |
| 4,348,656 | 9/1982 | Gorgone et al. | 382/135 |
| 4,349,111 | 9/1982 | Shah et al. | 209/534 |
| 4,355,300 | 10/1982 | Weber | 235/451 |
| 4,356,473 | 10/1982 | Freudenthal | 382/135 |
| 4,381,447 | 4/1983 | Horvath et al. | 250/223 |
| 4,386,432 | 5/1983 | Nakamura et al. | 382/135 |
| 4,442,541 | 4/1984 | Finkel et al. | 382/135 |
| 4,461,028 | 7/1984 | Okubo | 382/115 |
| 4,464,786 | 8/1984 | Nishito et al. | 382/135 |
| 4,464,787 | 8/1984 | Fish et al. | 382/135 |
| 4,470,496 | 9/1984 | Steiner | 194/200 |
| 4,480,177 | 10/1984 | Allen | 235/379 |
| 4,482,058 | 11/1984 | Steiner | 209/534 |
| 4,490,846 | 12/1984 | Ishida et al. | 382/135 |
| 4,503,963 | 3/1985 | Steiner | 194/200 |
| 4,513,439 | 4/1985 | Gorgone et al. | 382/135 |
| 4,539,702 | 9/1985 | Oka | 382/135 |
| 4,556,140 | 12/1985 | Okada | 194/206 |
| 4,558,224 | 12/1985 | Gober | 250/461.1 |
| 4,563,771 | 1/1986 | Gorgone et al. | 382/135 |
| 4,567,370 | 1/1986 | Falls | 250/461.1 |
| 4,587,412 | 5/1986 | Apisdorf | 235/449 |
| 4,587,434 | 5/1986 | Roes et al. | 250/556 |
| 4,592,090 | 5/1986 | Curl et al. | 382/135 |
| 4,628,194 | 12/1986 | Dobbins et al. | 235/379 |
| 4,645,936 | 2/1987 | Gorgone | 250/556 |
| 4,653,647 | 3/1987 | Hashimoto | 209/534 |
| 4,677,682 | 6/1987 | Miyagawa et al. | 382/135 |
| 4,700,368 | 10/1987 | Munn et al. | 377/8 |
| 4,707,843 | 11/1987 | McDonald et al. | 377/8 |
| 4,733,308 | 3/1988 | Nakamura et al. | 358/496 |
| 4,749,087 | 6/1988 | Buttifant | 382/135 |
| 4,817,176 | 3/1989 | Marshall et al. | 382/280 |
| 4,823,393 | 4/1989 | Kawakami | 382/135 |
| 4,837,426 | 6/1989 | Pease et al. | 235/440 |
| 4,874,931 | 10/1989 | Oka et al. | 235/379 |
| 4,881,268 | 11/1989 | Uchida et al. | 382/135 |
| 4,906,988 | 3/1990 | Copella | 340/825.34 |
| 4,908,516 | 3/1990 | West | 250/556 |
| 4,922,109 | 5/1990 | Bercovitz et al. | 250/556 |
| 4,973,851 | 11/1990 | Lee | 250/556 |
| 4,985,614 | 1/1991 | Pease et al. | 235/440 |
| 4,992,860 | 2/1991 | Hamaguchi et al. | 358/525 |
| 4,996,604 | 2/1991 | Ogawa et al. | 358/486 |
| 5,047,871 | 9/1991 | Meyer et al. | 358/486 |
| 5,068,519 | 11/1991 | Bryce | 235/449 |
| 5,122,754 | 6/1992 | Gotaas | 324/676 |
| 5,163,672 | 11/1992 | Mennie | 271/187 |
| 5,167,313 | 12/1992 | Dobbins et al. | 194/317 |
| 5,201,395 | 4/1993 | Takizawa et al. | 194/206 |
| 5,207,788 | 5/1993 | Geib et al. | 271/122 |
| 5,255,129 | 10/1993 | Jones | 235/449 |
| 5,261,518 | 11/1993 | Bryce | 194/206 |
| 5,295,196 | 3/1994 | Raterman et al. | 382/135 |
| 5,304,813 | 4/1994 | DeMan | 250/556 |
| 5,308,992 | 5/1994 | Crane et al. | 250/556 |
| 5,341,408 | 8/1994 | Melcher et al. | 377/8 |
| 5,430,664 | 7/1995 | Cargill et al. | 194/207 |
| 5,465,821 | 11/1995 | Akioka | 194/207 |
| 5,467,405 | 11/1995 | Raterman et al. | 382/135 |
| 5,467,406 | 11/1995 | Graves et al. | 382/135 |
| 5,633,949 | 5/1997 | Graves et al. | 382/135 |
| 5,640,463 | 6/1997 | Csulits | 382/135 |
| 5,790,693 | 8/1998 | Graves et al. | 382/135 |
| 5,815,592 | 9/1998 | Mennie et al. | 382/135 |
| 5,847,849 | 12/1998 | Funada et al. | 382/135- |

CURRENCY DISCRIMINATOR AND AUTHENTICATOR HAVING THE CAPABILITY OF HAVING ITS SENSING CHARACTERISTICS REMOTELY ALTERED

FIELD OF THE INVENTION

The present invention relates, in general, to currency identification and discrimination devices. More specifically, the present invention relates to altering the sensitivity levels of those devices via the use of a remotely-stationed main operating system.

BACKGROUND OF THE INVENTION

Numerous document handling devices exist which scan paper money to determine the characteristics of the money and count the number of pieces of paper money (hereinafter "notes"). These document handling devices can be generally segregated into two categories. First, currency counting devices count the number of notes without scanning to determine the value of the notes. In such a device, the operator may enter the type of note that is to be counted and the device then counts the number of notes. The note counting device may multiply the number of notes it counts by the value inputted by the operator to arrive at an overall value. Moreover, these paper counters are often configured with currency authenticators to detect counterfeit notes. Common types of methods by which counterfeits are detected include magnetic scanning, ultraviolet scanning, florescence scanning, and optical scanning.

The second type of device is one that not only counts notes and detects counterfeit notes, but one which also scans the notes to determine its denomination (e.g. $1, $5, $10, $20, etc.) Thus, these types of devices include extra sensors for this denomination-determining function. Typically, determining the denomination is accomplished through optical scanning.

In the use of either device, the operator sets the scanning sensitivity levels. This is typically accomplished through the actuation of keys on the device or by the use of touchscreens. However, these devices are often coupled to a host system such as a cash settlement machine. The operator of a such a central processing system, when desiring to alter the sensitivity characteristics of the device, must physically move himself or herself to the machine and perform the necessary keystrokes to accomplish the desired sensitivity modification.

SUMMARY OF THE INVENTION

It is a principal object of the present invention to provide an improved method and apparatus for altering the functions performed by a currency handling device from the host system.

In one embodiment, a note counting device is coupled to a host system such as a cash settlement machine. The operator of the host enters the denomination of the notes to be counted by the note counting device. The host system then sends a signal to the note counting device to establish the denomination that is to be counted. The sensitivity level within the note counting device is internally set corresponding to the denomination of the plurality of notes associated with the signal sent by the host. The note counting device then generates authenticity data from each of the plurality of notes and compares the authenticity data with the sensitivity level to determine whether each of the plurality of notes is genuine.

In another embodiment, the document handling device that is coupled to the host system has its default sensitivity settings altered through a similar process. Thus, the host sends a signal to the document handling device instructing it to replace the default sensitivity levels with a new set of sensitivity levels.

BRIEF DESCRIPTION OF THE DRAWINGS

Other objects and advantages of the invention will become apparent upon reading the following detailed description in conjunction with the drawings in which.

DETAILED DESCRIPTION OF THE PREFERRED EMBODIMENTS

A thorough description of a currency authentication and discrimination device is given in U.S. Ser. No. 08/494,091, entitled, "Currency Discriminator and Authenticator" filed Jun. 23, 1995, now U.S. Pat. 5,790,693, which has a common owner and is herein incorporated by reference in its entirety.

Figure 1:
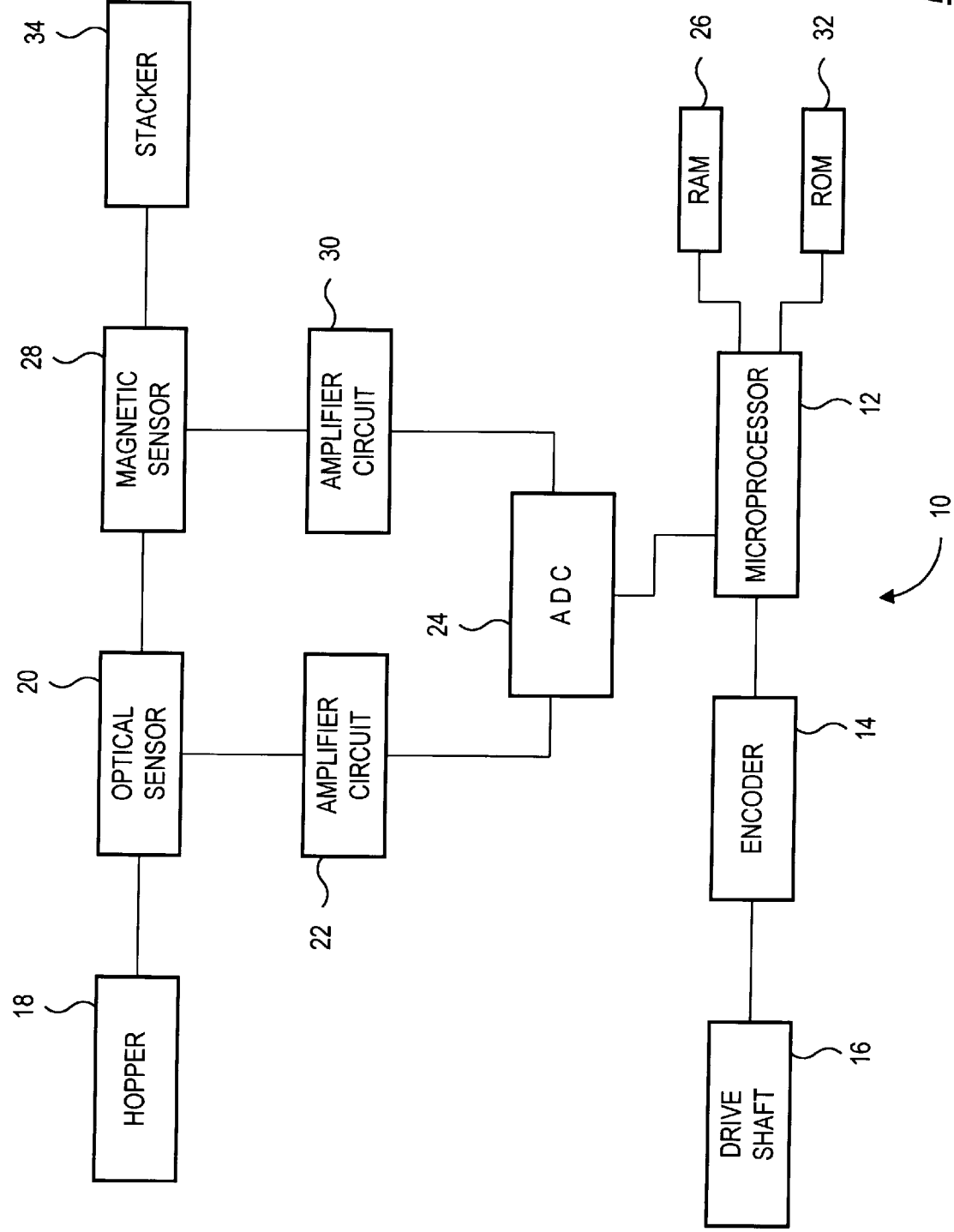
FIG. 1 is a block diagram of one embodiment of a system for detecting counterfeit currency according to the present invention.

A document handling device which authenticates and discriminates will now be discussed. Referring to the drawings, FIG. 1 shows a block diagram of a counterfeit detector 10. A microprocessor 12 controls the overall operation of the counterfeit detector 10. It should be noted that the detailed construction of a mechanism to convey notes through the counterfeit detector 10 is not related to the practice of the present invention. Many configurations are well-known in the prior art. An exemplary configuration includes an arrangement of pulleys and rubber belts driven by a single motor. An encoder 14 may be used to provide input to the microprocessor 12 based on the position of a drive shaft 16, which operates the note-conveying mechanism. The input from the encoder 14 allows the microprocessor to calculate the position of a note as it travels and to determine the timing of the operations of the counterfeit detector 10.

A stack of currency (not shown) may be deposited in a hopper 18 which securely holds the currency and allows the notes in the stack to be conveyed one at a time through the counterfeit detector 10. After the notes are conveyed to the interior of the counterfeit detector 10, a portion of the note is optically scanned by an optical sensor 20 of the type commonly known in the art. The optical sensor generates signals that correspond to the amount of light reflected by a small portion of the note. Signals from the optical sensor 20 are sent to an amplifier circuit 22, which, in turn, sends an output to an analog-to-digital converter (ADC) 24. The output of the ADC is read by the microprocessor 12. The microprocessor 12 stores each element of data from the optical sensor 20 in a range of memory locations in a random access memory ("RAM") 26, forming a set of image data that corresponds to the object scanned.

As the note continues its travel through the counterfeit detector 10, it is passed adjacent to a magnetic sensor 28, which detects the presence of magnetic ink. The magnetic sensor 28 desirably makes a plurality of measurements along a path parallel to one edge of the note being examined. For example, the path sensed by the magnetic sensor 28 may be parallel to the shorter edges of the note and substantially through the note's center. The output signal from the magnetic sensor 28 is amplified by an amplifier circuit 30 and digitized by the ADC 24. The digital value of each data point measured by the magnetic sensor 28 is read by the microprocessor 12, whereupon it is stored in a range of memory in the RAM 26.

The digitized magnetic data may be mathematically manipulated to simplify its use. For example, the value of all data points may be summed to yield a checksum, which may be used for subsequent comparison to expected values computed from samples of genuine notes. As will be apparent, calculation of a checksum for later comparison eliminates the need to account for the orientation of the note with respect to the magnetic sensor 28. This is true because the checksum represents the concentration of magnetic ink across the entire path scanned by the magnetic sensor 28, regardless of variations caused by higher concentrations in certain regions of the note.

The image data stored in the RAM 26 is compared by the microprocessor 12 to standard image data stored in a read only memory ("ROM") 32. The stored image data corresponds to optical data generated from genuine currency of a plurality of denominations. The ROM image data may represent various orientations of genuine currency to account for the possibility of a note in the stack being in a reversed orientation compared to other notes in the stack. If the image data generated by the note being evaluated does not fall within an acceptable limit of any of the images stored in ROM, the note is determined to be of an unknown denomination. The machine stops to allow removal of the document from the stack of currency.

If the image data from the note being evaluated corresponds to one of the images stored in the ROM 32, the microprocessor 12 compares the checksum of the magnetic data to one of a plurality of expected checksum values stored in the ROM 32. An expected checksum value is stored for each denomination that is being counted. The value of each expected checksum is determined, for example, by averaging the magnetic data from a number of genuine samples of each denomination of interest. If the value of the measured checksum is within a predetermined range of the expected checksum, the note is considered to be genuine. If the checksum is not within the acceptable range, the operator is signaled that the document is suspect and the operation of the counterfeit detector 10 is stopped to allow its retrieval.

If the note passes both the optical evaluation and the magnetic evaluation, it exits the counterfeit detector 10 to a stacker 34. Furthermore, the counterfeit detector 10 may desirably include the capability to maintain a running total of genuine currency of each denomination.

It should be noted that the magnetic checksum is only compared to the expected checksum for a single denomination (i.e. the denomination that the optical data comparison has indicated). Thus, the only way in which a note can be classified as genuine is if its magnetic checksum is within an acceptable range for its specific denomination. For a counterfeit note to be considered genuine by the counterfeit detector of the present invention, it would have to be within an acceptable range in the denomination-discriminating optical comparison and have a distribution of magnetic ink within an acceptable range for its specific denomination.

To summarize the operation of the system, a stack of notes is fed into the hopper 18. Each note is transported adjacent to the optical sensor 20, which generates image data corresponding to one side of the note. The note is also scanned by a magnetic sensor 28 and a plurality of data points corresponding to the presence of magnetic ink are recorded by the microprocessor 12. A checksum is generated by adding the total of all magnetic data points. The image data generated by the optical sensor 20 is compared to stored images that correspond to a plurality of denominations of currency. When the denomination of the note being evaluated has been determined, the checksum is compared to a stored checksum corresponding to a genuine note of that denomination. The microprocessor 12 generates a signal indicating that the note is genuine or counterfeit depending on whether the data is within a predetermined range of the expected value. Notes exit the counterfeit detector 10 and are accumulated in the stacker 34.

The device and processes described thus far are for a document handling device which both discriminates between denominations and authenticates the bills it scans to ensure that no counterfeits are present. If the denominating feature was removed, then the device would simply be a note counting device which would rely upon the operator to enter the denomination that was to be processed.

Figure 2:
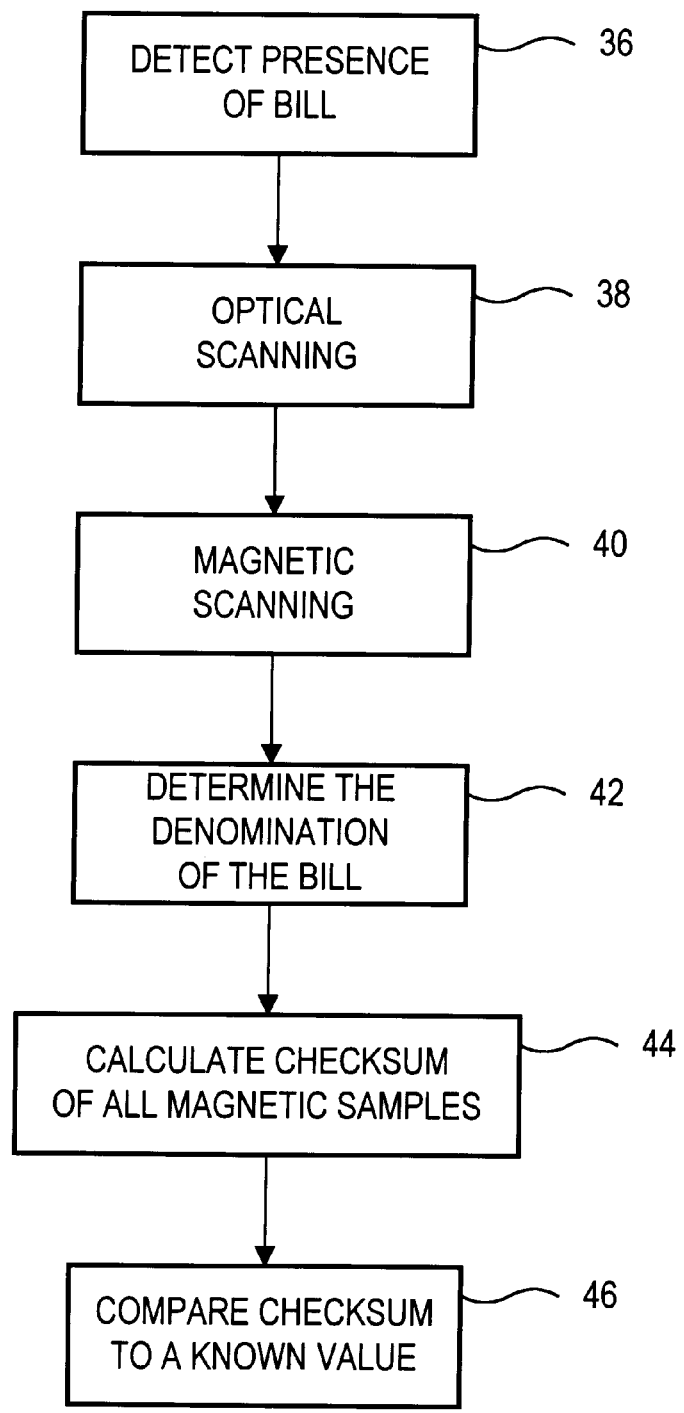
FIG. 2 is a flow diagram that illustrates the operation of the counterfeit detector according to the present invention.

FIG. 2 is a flow diagram of the logic used by a document handling device of the present invention. At step 36, the presence of a note approaching the optical sensor 20 is detected by the microprocessor 12, which initiates an optical scanning operation 38. Image data generated by the optical scanning operation are stored in RAM 26. The number of optical samples taken is not critical to the operation of the present invention, but the probability of accurate classification of the denomination of a note increases as the number of samples increases. Step 38 would be completely eliminated if the document handling device is simply a note counting device. Instead, to determine denomination, a step preceding step 36 would have the operator inputting the denomination of the notes to be processed.

At step 40, the microprocessor 12 initiates the magnetic scanning operation. The data points obtained by the magnetic scanning operation may be stored in the RAM 26 and added together later to yield a checksum, as shown in step 44. Alternatively, the checksum may be calculated by keeping a running total of the magnetic data values by adding each newly acquired value to the previous total. As with the optical scanning operation, the number of data points measured is not essential, but the chances of accurately identifying a counterfeit note based on the concentration of magnetic ink improve as the number of samples increases. At step 42, the microprocessor determines the denomination of the note by comparing the image data to a plurality of known images, each of which corresponds to a specific denomination of currency. The note is identified as belonging to the denomination corresponding to one of the known scan patterns if the correlation between the two is within an acceptable range. At step 46, the checksum resulting from the summation of the magnetic data points is compared to an expected value for a genuine note of the denomination identified by the comparison of the image data to the stored data.

The expected value may be determined in a variety of ways. One method is to empirically measure the concentration of magnetic ink on a sample of genuine notes and average the measured concentrations. Another method is to program the microprocessor to periodically update the expected value based on magnetic data measurements of notes evaluated by the counterfeit detector over a period of time.

If the checksum of the note being evaluated is within a predetermined range of the expected value, the note is considered to be genuine. Otherwise, the note is considered to be counterfeit. As will be apparent, the choice of an acceptable variation from the expected checksum determines the sensitivity of the counterfeit detector. If the range chosen is too narrow, the possibility that a genuine note will be classified as counterfeit is increased. On the other hand, the possibility that a counterfeit note will be classified as genuine increases if the acceptable range is too broad.

Figure 3A:
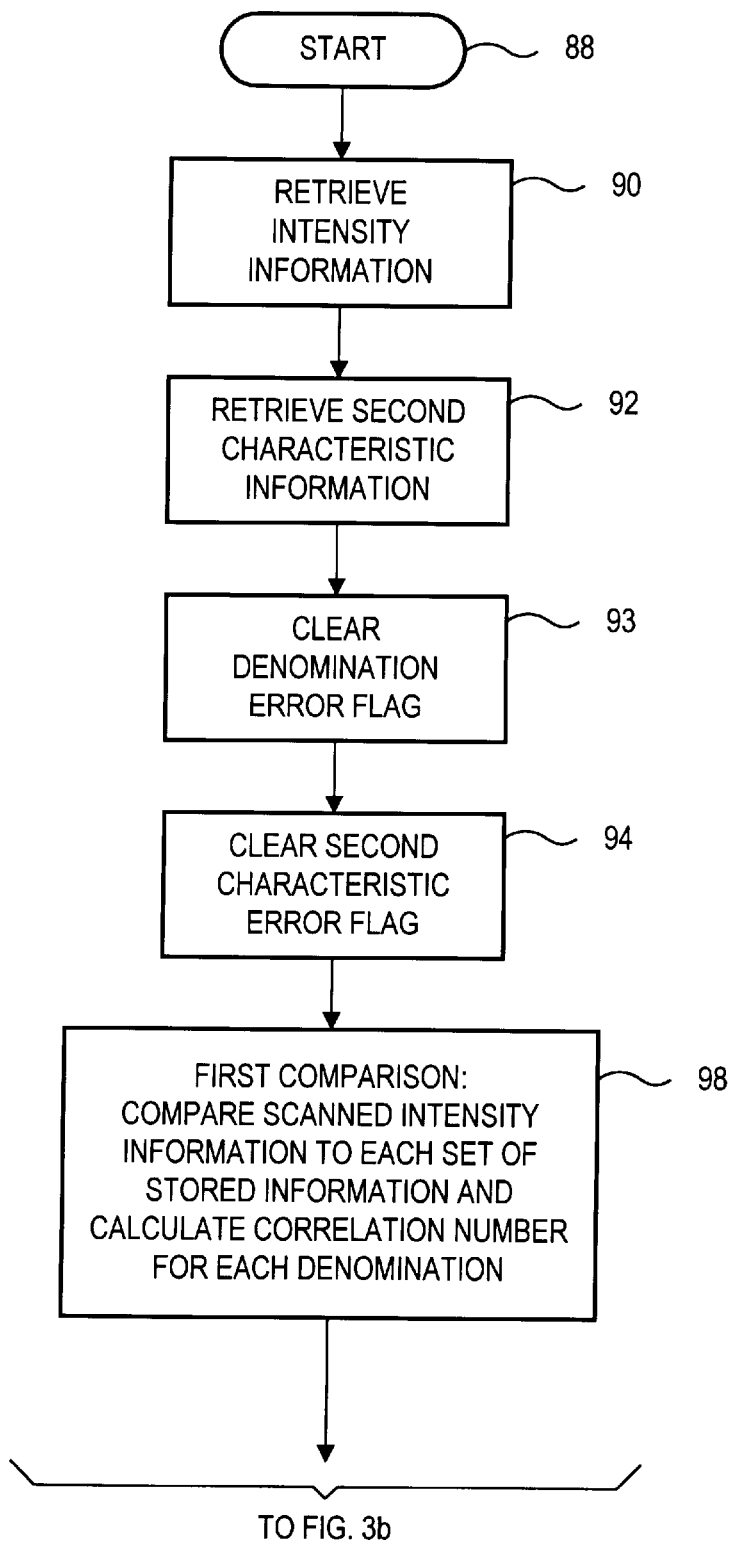
FIGS. 3a and 3b comprise a flowchart illustrating the sequence of operations involved in implementing the discrimination and authentication system of FIG. 4.
Figure 3B:
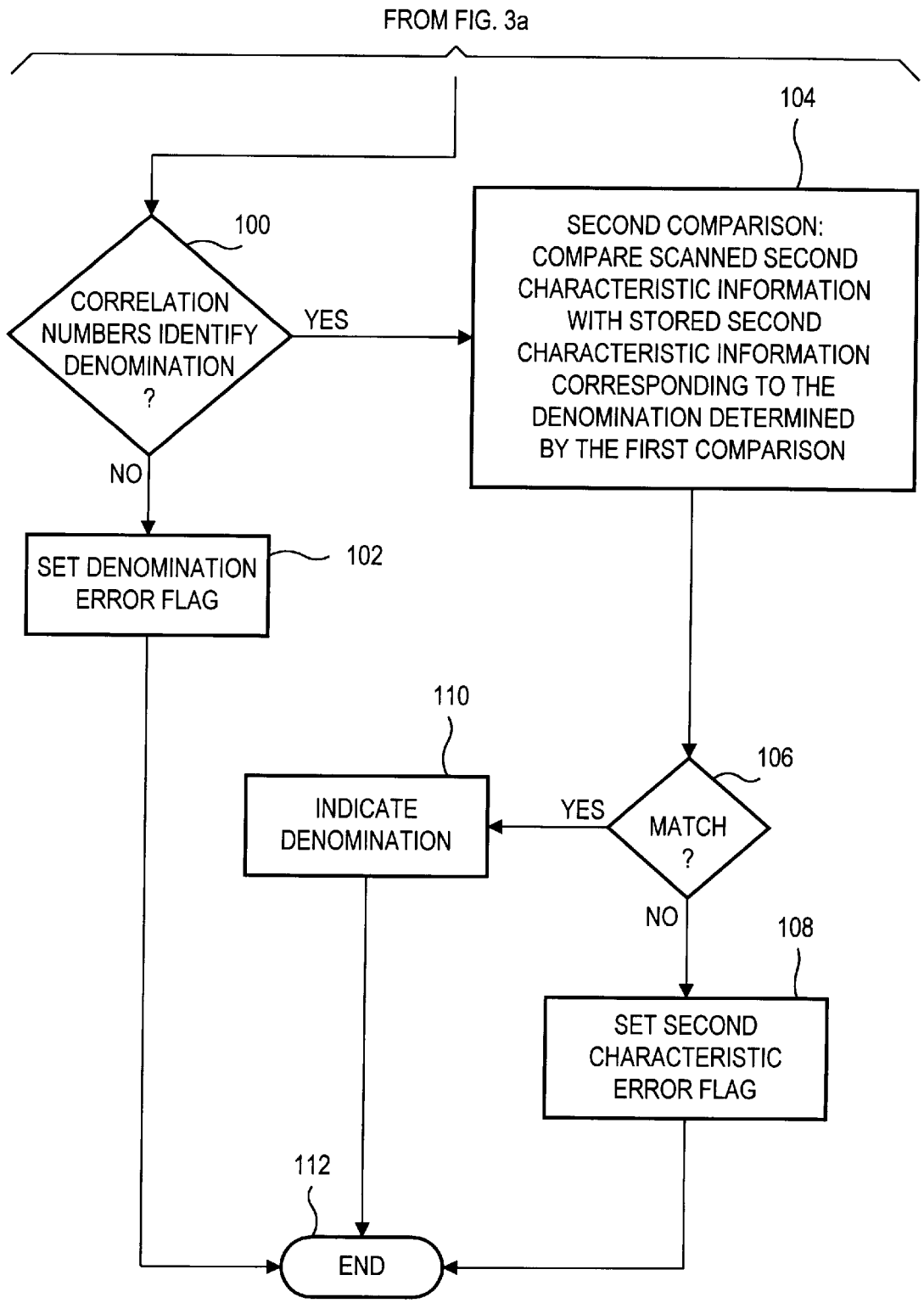

FIGS. 3a and 3b comprise a flowchart illustrating the sequence of operations involved in implementing a discrimination and authentication system which can be utilized in the present in the present invention. Upon the initiation of the sequence of operations (step 88), reflected light intensity information is retrieved from a note being scanned (step 90). Similarly, second characteristic information is also retrieved from the note being scanned (step 92). Denomination error and second characteristic error flags are cleared (steps 93 and 94).

Next the scanned intensity information is compared to each set of stored intensity information corresponding to genuine notes of all denominations the system is programmed to accommodate (step 98). For each denomination, a correlation number is calculated. The system then, based on the correlation numbers calculated, determines either the denomination of the scanned note or generates a denomination error by setting the denomination error flag (steps 100 and 102). In the case where the denomination error flag is set (step 102), the process is ended (step 112). Alternatively, if based on this first comparison, the system is able to determine the denomination of the scanned note, the system proceeds to compare the scanned second characteristic information with the stored second characteristic information corresponding to the denomination determined by the first comparison (step 104).

For example, if as a result of the first comparison the scanned note is determined to be a $20 note, the scanned second characteristic information is compared to the stored second characteristic information corresponding to a genuine $20 note. In this manner, the system need not make comparisons with stored second characteristic information for the other denominations the system is programmed to accommodate. If based on this second comparison (step 104) it is determined that the scanned second characteristic information does not sufficiently match that of the stored second characteristic information (step 106), then a second characteristic error is generated by setting the second characteristic error flag (step 108) and the process is ended (step 112). If the second comparison results in a sufficient match between the scanned and stored second characteristic information (step 106), then the denomination of the scanned note is indicated (step 110) and the process is ended (step 112).

TABLE 1

| Denomination | Sensitivity | | | | |
| --- | --- | --- | --- | --- | --- |
| | 1 | 2 | 3 | 4 | 5 |
| $1 | 200 | 250 | 300 | 375 | 450 |
| $2 | 100 | 125 | 150 | 225 | 300 |
| $5 | 200 | 250 | 300 | 350 | 400 |
| $10 | 100 | 125 | 150 | 200 | 250 |
| $20 | 120 | 150 | 180 | 270 | 360 |
| $50 | 200 | 250 | 300 | 375 | 450 |
| $100 | 100 | 125 | 150 | 250 | 350 |

An example of an interrelationship between authentication based on a first and second characteristic can be seen by considering Table 1. Table 1 depicts relative total magnetic content thresholds for various denominations of genuine notes. Columns 1–5 represent varying degrees of sensitivity selectable by a user of a device employing the present invention. The values in Table 1 are set based on the scanning of genuine notes of varying denominations for total magnetic content and setting required thresholds based on the degree of sensitivity selected. The information in Table 1 is based on the total magnetic content of a genuine $1 being 1000. The following discussion is based on a sensitivity setting of 4. In this example it is assumed that magnetic content represents the second characteristic tested. If the comparison of first characteristic information, such as reflected light intensity, from a scanned note and stored information corresponding to genuine notes results in an indication that the scanned note is a $10 denomination, then the total magnetic content of the scanned note is compared to the total magnetic content threshold of a genuine $10 note, i.e., 200. If the magnetic content of the scanned note is less than 200, the note is rejected. Otherwise it is accepted as a $10 note.

According to another feature of the present invention, the doubling or overlapping of notes in the transport system is detected by the provision of a pair of optical sensors which are co-linearly disposed opposite to each other within the scan head area along a line that is perpendicular to the direction of note flow, i.e., parallel to the edge of test notes along their wide dimensions as the notes are transported across the optical scan head. The pair of optical sensors S1 and S2 are co-linearly disposed within the scan head area in close parallelism with the wide dimension edges of incoming test notes. In effect, the optical sensors S1 and S2 which have corresponding light sources and photodetectors, are disposed opposite each other along a line within the scan head area which is perpendicular to the direction of note flow. These sensors S1 and S2 serve as second detectors for detecting second characteristic information, namely density.

Although not illustrated in the drawings, it should be noted that corresponding photodetectors are provided in immediate opposition to the corresponding light sources and underneath the flat section of the transport path. These detectors detect the beam of coherent light directed downwardly onto the note transport path from the light sources corresponding to the sensors S1 and S2 and generate an analog output which corresponds to the sensed light. Each such output is converted into a digital signal by a conventional ADC converter unit whose output is fed as a digital input to and processed by the system controller in a manner similar to that indicated in the arrangement of FIG. 1.

The presence of a note which passes under the sensors S1 and S2 causes a change in the intensity of the detected light and a corresponding change in the analog output of the detectors. This serves as a convenient means for density-based measurements for detecting the presence of "doubles" (two or more overlaid or overlapped notes) during the currency recognition and counting process. For instance, the sensors may be used to collect a predefined number of density measurements on a test note, and the average density value for a note may be compared to predetermined density thresholds (based, for instance, on standardized density readings for master notes) to determine the presence of overlaid notes or doubles.

Figure 4:
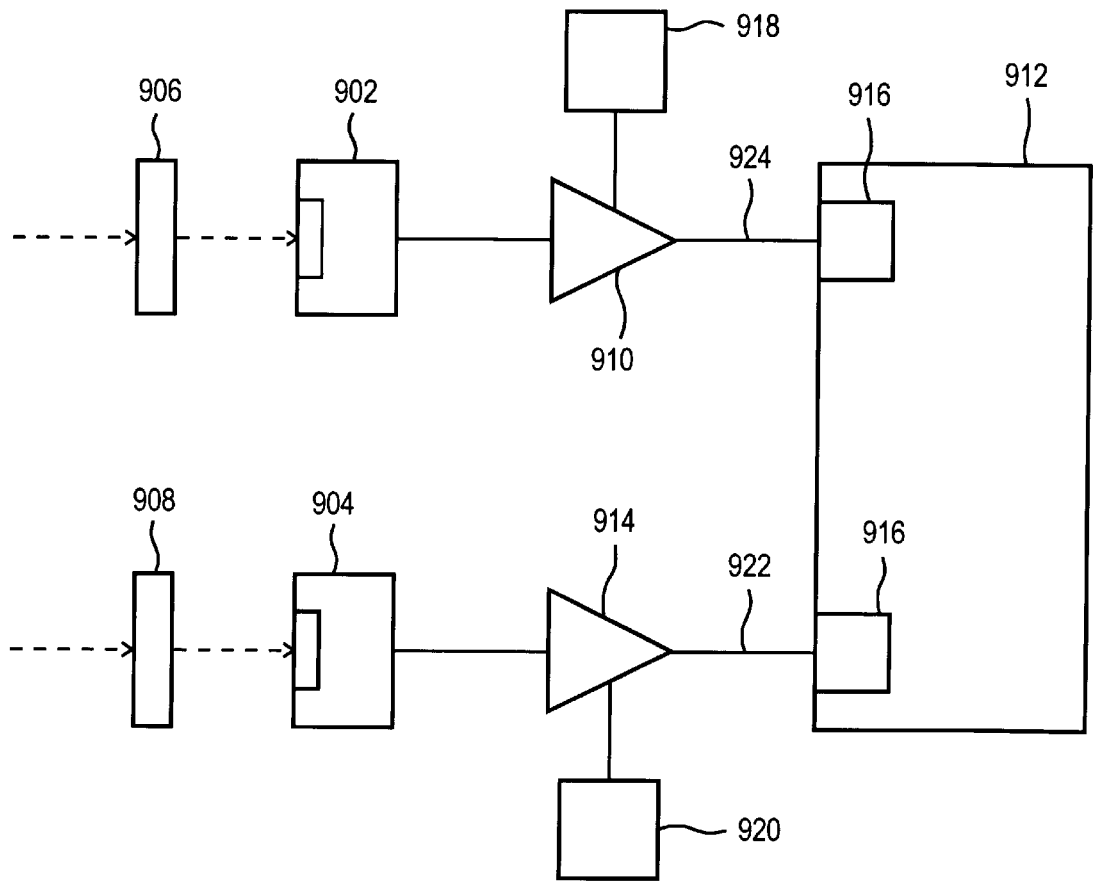
FIG. 4 is a functional block diagram illustrating a preferred embodiment of a document authenticating system according to the present invention.

Referring now to FIG. 4, there is shown a functional block diagram illustrating a preferred embodiment of a document authenticating system according to the present invention. FIG. 4 shows an UV sensor 902, a fluorescence sensor 904, and filters 906, 908 of a detection system such as the detection system 806 of FIG. 1. Light from the document passes through the filters 906, 908 before striking the sensors 902, 904, respectively. An ultraviolet filter 906 filters out visible light and permits UV light to be transmitted and hence to strike UV sensor 902. Similarly, a visible light filter 908 filters out UV light and permits visible light to be transmitted and hence to strike fluorescence sensor 904. Accordingly, UV light, which has a wavelength below 400 nm, is prevented from striking the fluorescence sensor 904 and visible light, which has a wavelength greater than 400 nm, is prevented from striking the UV sensor 902. In a preferred embodiment the UV filter 906 transmits light having a wavelength between about 260 nm and about 380 nm and has a peak transmittance at 360 nm. In a preferred embodiment, the visible light filter 908 is a blue filter and preferably transmits light having a wavelength between about 415 nm and about 620 nm and has a peak transmittance at 450 nm. The above preferred blue filter comprises a combination of a blue component filter and a yellow component filter. The blue component filter transmits light having a wavelength between about 320 nm and about 620 nm and has a peak transmittance at 450 nm. The yellow component filter transmits light having a wavelength between about 415 nm and about 2800 nm. Examples of suitable filters are UG1 (UV filter), BG23 (blue bandpass filter), and GG420 (yellow longpass filter), all manufactured by Schott. In a preferred embodiment the filters are about 8 mm in diameter and about 1.5 mm thick.

The UV sensor 902 outputs an analog signal proportional to the amount of light incident thereon and this signal is amplified by amplifier 910 and fed to a microcontroller 912. Similarly, the fluorescence sensor 904 outputs an analog signal proportional to the amount of light incident thereon and this signal is amplified by amplifier 914 and fed to a microcontroller 912. Analog-to-digital converters 916 within the microcontroller 912 convert the signals from the amplifiers 910, 914 to digital and these digital signals are processed by the software of the microcontroller 912. The UV sensor 902 may be, for example, an ultraviolet enhanced photodiode sensitive to light having a wavelength of about 360 nm and the fluorescence sensor 904 may be a blue enhanced photodiode sensitive to light having a wavelength of about 450 nm. Such photodiodes are available from, for example, Advanced Photonix, Inc., Mass. The microcontroller 912 may be, for example, a Motorola 68HC16.

The exact characteristics of the sensors 902, 904 and the filters 906, 908 including the wavelength transmittance ranges of the above filters are not as critical to the present invention as the prevention of the fluorescence sensor from generating an output signal in response to ultraviolet light and the ultraviolet sensor from generating an output signal in response to visible light. For example, instead of, or in addition to, filters, an authentication system according to the present invention may employ an ultraviolet sensor which is not responsive to light having a wavelength longer than 400 nm and/or a fluorescence sensor which is not responsive to light having a wavelength shorter than 400 nm.

Calibration potentiometers 918, 920 permit the gains of amplifiers 910, 914 to be adjusted to appropriate levels. Calibration may be performed by positioning a piece of white fluorescent paper over the sensors. The potentiometers 918, 920 may then be adjusted so that the output of the amplifiers 910, 914 is 5 volts. Alternatively, calibration may be performed using genuine currency such as a piece of genuine U.S. currency. Potentiometers 918 and 920 may be replaced with electronic potentiometers located, for example, within the microcontroller 912. Such electronic potentiometers may permit automatic calibration based on the processing of a single genuine document or a plurality of documents as will be described below.

The implementation of a preferred embodiment of a document authenticating system according to the present invention as illustrated in FIG. 4 with respect to the authentication of U.S. currency will now be described. As discussed above, it has been determined that genuine United States currency reflects a high level of ultraviolet light and does not fluoresce under ultraviolet illumination. It has also been determined that under ultraviolet illumination counterfeit United States currency exhibits one of the four sets of characteristics listed below:

1) Reflects a low level of ultraviolet light and fluoresces;
2) Reflects a low level of ultraviolet light and does not fluoresce;
3) Reflects a high level of ultraviolet light and fluoresces;
4) Reflects a high level of ultraviolet light and does not fluoresce.

Counterfeit notes in categories (1) and (2) may be detected by a currency authenticator employing an ultraviolet light reflection test according to a preferred embodiment of the present invention. Counterfeit notes in category (3) may be detected by a currency authenticator employing both an ultraviolet reflection test and a fluorescence test according to another preferred embodiment of the present invention. Only counterfeits in category (4) are not detected by the authenticating methods of the present invention.

According to a preferred embodiment of the present invention, fluorescence is determined by any signal that is above the noise floor. Thus, the amplified fluorescent sensor signal 922 will be approximately 0 volts for genuine U.S. currency and will vary between approximately 0 and 5 volts for counterfeit notes depending upon their fluorescent characteristics. Accordingly, an authenticating system according to a preferred embodiment of the present invention will reject notes when signal 922 exceeds approximately 0 volts.

It has been found that the voltage ratio between counterfeit and genuine U.S. notes varies from a discernible 2-to-1 ratio to a non-discernible ratio. According to a preferred embodiment of the present invention a 2-to-1 ratio is used to discriminate between genuine and counterfeit notes. For example, if a genuine U.S. note generates an amplified UV output sensor signal 924 of 4.0 volts, documents generating an amplified UV output sensor signal 924 of 2.0 volts or less will be rejected as counterfeit. As described above, this threshold of 2.0 volts may either be lowered as the light source degrades or the gain of the amplifier 910 may be adjusted so that 2.0 volts remains an appropriate threshold value.

According to a preferred embodiment of the present invention, the determination of whether the level of UV reflected off a document is high or low is made by sampling the output of the UV sensor at a number of intervals, averaging the readings, and comparing the average level with the predetermined high/low threshold. Alternatively, a comparison may be made by measuring the amount of UV light reflected at a number of locations on the note and comparing these measurements with those obtained from genuine notes. Alternatively, the output of one or more UV sensors may be processed to generate one or more patterns of reflected UV light and these patterns may be compared to the patterns generated by genuine notes.

In a similar manner, the presence of fluorescence may be performed by sampling the output of the fluorescence sensor at a number of intervals. However, in a preferred embodiment, a note is rejected as counterfeit U.S. currency if any of the sampled outputs rise above the noise floor. However, the alternative methods discussed above with respect to processing the signal or signals of a UV sensor or sensors may also be employed, especially with respect to currencies of other countries or other types of documents which may employ as security features certain locations or patterns of fluorescent materials.

A currency authenticating system according to the present invention may be provided with means, such as a display, to indicate to the operator the reasons why a document has been rejected, e.g., messages such as "UV FAILURE" or "FLUORESCENCE FAILURE." A currency authenticating system according to the present invention may also permit the operator to selectively choose to activate or deactivate either the UV reflection test or the fluorescence test or both. A currency authenticating system according to the present invention may also be provided with means for adjusting the sensitivities of the UV reflection and/or fluorescence test, for example, by adjusting the respective thresholds. For example, in the case of U.S. currency, a system according to the present invention may permit the high/low threshold to be adjusted, for example, either in absolute voltage terms or in genuine/suspect ratio terms.

According to another embodiment of the present invention, the operator of a document handling device such as a currency counter or a currency denomination discriminator is provided with the ability to adjust the sensitivity of a UV reflection test, a fluorescence test, and a magnetic test. For example, a note counter embodying a preferred embodiment of the present invention may provide the operator the ability to set the authentication tests to a high or a low sensitivity. For example, the note counter may be provided with a set up mode which enables the operator to adjust the sensitivities for each of the above tests for both the high and the low modes. This may be achieved through appropriate messages being displayed on, for example, display 82 of FIG. 4 and the input of selection choices via an input device such as a keyboard or buttons. In one embodiment, the device permits the operator to adjust the UV test, the fluorescent test, and the magnetic test in a range of sensitivities 1–7, with 7 being the most sensitive, or to turn each test off. The device permits setting the sensitivity as described above for the three authentication tests for both a low sensitivity (low denomination) mode and a high sensitivity (high denomination) mode. The above setting options are summarized in Table 2.

TABLE 2

| Mode | UV Test Sensitivity | Fluorescent Test Sensitivity | Magnetic Test Sensitivity |
| --- | --- | --- | --- |
| High | off, 1–7 | off, 1–7 | off, 1–7 |
| Low | off, 1–7 | off, 1–7 | off, 1–7 |

According to an alternate embodiment, the above high/low modes are replaced with denomination modes, for example, one for each of several denominations of currency (e.g., $1, $2, $5, $10, $20, $50 and $100). For each denomination, the sensitivity of the three tests may be adjusted between 1–7 or off. According to one embodiment for operator manually selects either the high or low mode or the appropriate denomination mode based on the values of the notes to be processed. This manual mode selection system may be employed in, for example, either a note counter or a currency denomination discriminator. According to another embodiment the document handling system automatically selects either the high or low mode or the appropriate denomination mode based on the values of the notes being processed. This automatic mode selection system may be employed in systems capable of identifying the different values or kinds of documents, for example, a currency denomination discriminator.

Accordingly, in the low mode or for low denomination modes (e.g., $1, $2) the is three tests may be set to relatively low sensitivities (e.g., UV test set at 2, fluorescent test set at 5, and magnetic test set at 3). Conversely, in the high mode or for high denomination modes (e.g., $50, $100) the three tests may be set to relatively high sensitivities (e.g., UV test set at 5, fluorescent test set at 6, and magnetic test set at 7). In this way, authentication sensitivity may be increased when processing high value notes where the potential harm or risk in not detecting a counterfeit may be greater and may be decreasing when processing low value notes where the potential harm or risk in not detecting a counterfeit is lesser and the annoyance of wrongly rejecting genuine notes is greater. Also the UV, fluorescent, and/or magnetic characteristics of genuine notes can vary due to number of factors such wear and tear or whether the note has been washed (e.g., detergents). As a result, the fluorescent detection of genuine U.S. currency, for example, may yield readings of about 0.05 or 0.06 volts.

The UV and fluorescent thresholds associated with each of the seven sensitivity levels may be set, for example, as shown in Table 3.

TABLE 3

| Sensitivity Level | UV Test (Volts) | Fluorescent Test (Volts) |
| --- | --- | --- |
| 1 | 0.2 | 0.7 |
| 2 | 0.3 | 0.6 |
| 3 | 0.4 | 0.5 |
| 4 | 0.5 | 0.3 |
| 5 | 0.55 | 0.2 |
| 6 | 0.6 | 0.15 |
| 7 | 0.7 | 0.1 |

In performing UV test according to one embodiment, the no note reflectance value is subtracted from resulting UV reflectance voltages associated with the scanning of a particular note, and this difference is compared against the appropriate threshold value such as those in table 3 in determining whether to reject a note.

Upon a note failing one or more of the above tests, an appropriate error message may be displayed such as "Suspect Document U—" for failure of the UV reflection test, "Suspect Document-F-" for failure of the fluorescent test, "Suspect Document—M" for failure of the magnetic test, or some combination thereof when more than one test is failed (e.g., "Suspect Document UF-" for failure of both the UV reflection test and the fluorescent test).

Although the document handling system described thus far has been one which denominates and then authenticates the note based on the denomination that was scanned, the previously-described components and algorithms are the same for a device which merely counts and authenticates currency (i.e. does not determine denomination). The only difference is that the operator of a note counting device must instruct that device what denomination and/or series of the note that is to be processed so that the device uses the correct sensitivity levels. Thus, the note counting device is a more simplistic system since the processes related to determining the denomination of the note are removed.

Figure 5:
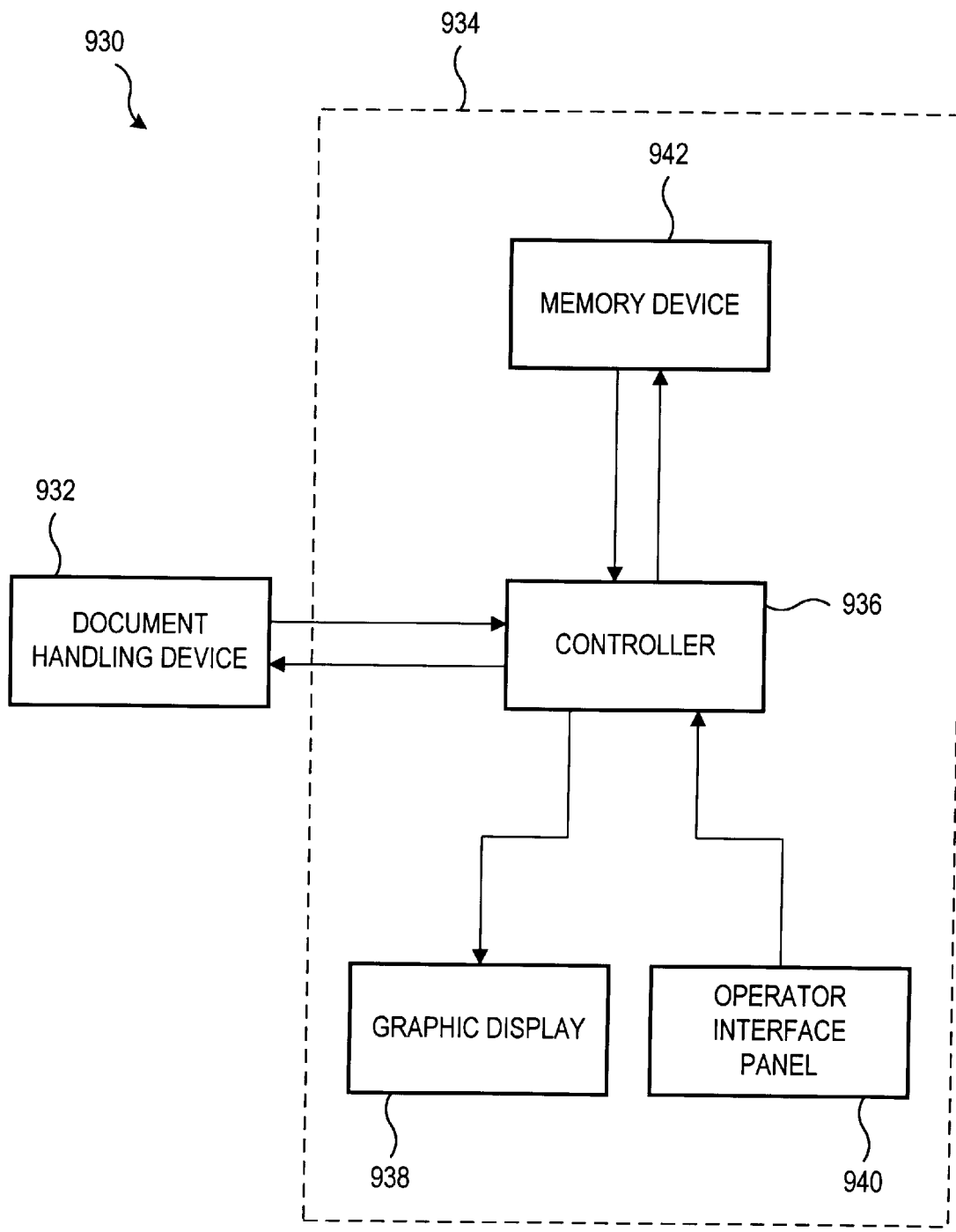
FIG. 5 is a system block diagram of the present invention.

Referring now to FIG. 5, a system 930 is illustrated in which a document handling device 932 is coupled to a cash settlement machine 934. The cash settlement machine 934 is generally used to gather and record data relating to monetary transactions. For example, the operator of the cash settlement machine 934 may be a supervisor who is interested in the value of transactions performed by subordinates interacting with consumers at a transaction station. The cash settlement machine 934 records various financial data such as cash, coins, credit card receipts, coupons and other related data from each station. The data can be input into the cash settlement machine 934 manually or automatically via numerous peripheral machines communicating with the cash settlement machine 934 such as the document handling system 932. The cash settlement machine 934 typically also permits the operator to manipulate the data.

In the cash settlement machine 934, an operator interface panel 936 provides for operator interaction with the cash settlement machine 934. Typically, the operator interface panel 936 is a conventional mechanical keyboard with depressable keys. Alternatively, the cash settlement machine 934 may receive inputs from the operator through a touchscreen. Such a configuration is described in U.S. Ser. No. 08/467,585 entitled "Cash Settlement Machine" which is commonly owned and is herein incorporated by reference in its entirety. The keyboard and/or the touchscreen are used to enter data, or to instruct the cash settlement machine 934 to perform a function such as data manipulation or communication with a peripheral device. A graphics display monitor 938 displays numerous data for the operator including the status of the cash settlement machine 934, the information that is being manipulated, the operability of a peripheral device, etc.

Additionally, the controller 936 of the cash settlement machine 934 may record data to or retrieve data from a memory device 942. The memory device 942 contains numerous registers for storing blocks of information. For example, each register may be associated with a cash settlement transaction or a particular worker and is labeled accordingly by the operator. The memory device 942 can be external or internal to the cash settlement machine 934, but generally it is internal. The memory device 942 also contains the software which the controller 936 operates to perform desired functions, including software used to communicate with the peripheral devices such as the document handling system 932.

Many advanced cash settlement machines 934 employ a personal computer dedicated solely to performing its functions. As would be expected, these advanced cash settlement machines 934 have more capabilities but are much more expensive in comparison with the basic cash settlement devices which only have an E-PROM (fixed-function terminal). The present invention works with either type of cash settlement machine.

The types of data sent between the cash settlement machine 934 and the document handling device 932 are usually the number of notes counted or the value of the notes scanned. However, the present invention contemplates the system 930 being more versatile in that the operator of the system, through the use of the cash settlement machine 934, remotely alters the operating characteristics of the document handling device 932. For example, the operator of the cash settlement machine 934 alters the sensitivity levels for determining the denomination of notes (assuming the document handling device 932 denominates notes). The denomination may be determined by optical scanning which produces a correlation number for a specific bill and compares it to a known set of values for each type of note. Such a method and apparatus is detailed in U.S. Pat. No. 5,295,196 entitled "Method and Apparatus for Currency Discrimination and Counting" which is herein incorporated by reference in its entirety. The sensitivity levels which are described above for authenticating notes (when the document handling device 932 detects counterfeits) can also be altered. And, the density is levels (protecting against multiple notes) of the notes that are processed can be modified. Thus, the operator of the cash settlement machine 934 instructs the document handling device 932 by entering the appropriate information at the operator interface panel 936 that results in corresponding commands being sent to the document handling device 932. Additionally, error messages which occur in the document handling device 932 can also be reported to the operator of the cash settlement machine 934.

According to one embodiment, the remote altering of the sensitivity and density levels is especially useful when the operator of the cash settlement machine 934 is remotely located from the document handling device 932 (in another room or a different building). In another embodiment, this feature is especially useful when the document handling device 932 is one which only counts notes and has no means for determining denomination. In this situation, the operator of the cash settlement machine 934 knows that a certain denomination will be processed at the note counter and so instructs the cash settlement machine 934. The cash settlement machine 934, upon receiving this instruction from the operator, sends a signal to the note counting device indicating the denomination that is to be processed. The note counting device then sets the sensitivity level accordingly. For example, the operator may enter at the host system that $20 notes will be processed. The host then relays to the note counting device that $20 notes will be counted. The note counting device then chooses the optical sensitivity of 0.4 volts for UV and 0.5 volts for fluorescence (see Table 3) assuming a level 3 sensitivity for a $20 note has been established. If this option were not available, the operator would be able to tell the cash settlement machine 934 that a certain denomination was to be processed at the note counting device. However, the operator would then be required to walk to the note counting device and enter the appropriate sensitivity levels through manual actuation of the keys or the touchscreen at the note counting device. Consequently, by utilizing the communication link between the note counter and the cash settlement machine 934 to alter the sensitivity levels, the overall efficiency of the operation is increased. Furthermore, the need to rely on the operator remembering each time the sensitivities require altering is minimized or alleviated.

It should be noted that this situation does not occur in a document handling device 932 which denominates and authenticates. In these machines, once a note's denomination is determined by the device, it can then automatically adjust the sensitivity levels to accommodate the particular denomination of the note. However, the operator of the host may instruct the host to alter the overall sensitivity levels for authentication from "high" to "low" or vice versa as shown in Table 2.

In addition to the denomination dictating the sensitivity levels, the series of a particular denomination may also invoke the need for altering the sensitivity levels. A common example of a series of a particular denomination which has different authenticity characteristics is the 1996 series $100 U.S. note. This note has many different authenticity characteristics which are different from the pre-1996 $100 notes. Some foreign currencies also have a need for this series-type differentiation.

In some cases, it is also necessary to adjust the default sensitivity levels for a certain group of notes to be processed. For example, an operator of the cash settlement machine 934 may recognize that the notes to be entered at the document handling device 932 will likely be newly-issued notes and, accordingly, adjust the density level since there is a greater tendency for these notes to stick together. Alternatively, if the operator knows the stacks of notes received from a certain geographical region or at a certain time period are more likely to have counterfeit notes, then the operator may select a higher sensitivity level than the default setting for the note. For example, the sensitivity in Table 3 may be altered from Level 2 (assuming Level 2 is the default setting) to Level 4. A corresponding sensitivity level change can also be made for the magnetic test. Thus, the magnetic sensitivity, the UV sensitivity, and the fluorescence sensitivity can be uniformly modified. Alternatively, each of these sensitivities can be modified independently.

To accomplish the communication functions listed above, the document handling device 932 must have the ability to react to signals received from the cash settlement machine 934. Therefore, the document handling device 932 has an electrical port to which a communications cable (attached to the host system) is connected. The electrical port is coupled to the controller of the document handling device 932.

Use of an established communications protocol allows the document handling device 932 to detect multiple signals from the cash settlement machine 934, differentiate between the signals, and perform the function associated with a given signal. Additionally, the protocol also may permit the sending of a counterfeit detection signal to the cash settlement machine 934 when the document handling device 932 processes a note that falls outside the proper sensitivity levels. These signals are sent via the electrical port and the communications cable.

While the present invention has been described with reference to one or more particular embodiments, those skilled in the art will recognize that many changes may be made thereto without departing from the spirit and scope of the present invention, which is set forth in the following claims.

What is claimed is:

1. A method of detecting counterfeit currency in a note counting device, said note counting device being coupled to a host that is remotely located from said note counting device, said note counting device and said remotely located host being controlled by an operator, the method comprising the steps of:

(a) determining a denomination of a plurality of notes to be counted by said note counting device;

(b) entering, under the command of said operator, said denomination of said plurality of notes at said remotely located host;

(c) instructing, under the command of said operator, said remotely located host to send a signal to said note counting device to establish said denomination that is to be counted;

(d) setting a sensitivity level within said note counting device corresponding to said denomination of said plurality of notes associated with said signal;

(e) generating authenticity data from each of said plurality of notes; and (f) comparing said authenticity data with said sensitivity level to determine whether each of said plurality of notes is genuine.

2. The method of claim 1 wherein said step of generating authenticity data includes the step of determining a checksum corresponding to the concentration of magnetic ink on each of said plurality of notes.

3. The method of claim 2 wherein said step of generating a checksum includes the substeps of:

(a) magnetically scanning along a predetermined path on each of said plurality of notes;

(b) measuring magnetic concentration at a plurality of data points along said predetermined path, each of said data points having a value that corresponds to the concentration of magnetic ink; and (c) generating said checksum by adding said value of magnetic concentration at each of said data points.

4. The method of claim 3 wherein each of said plurality of notes is generally rectangular in shape and said predetermined path is substantially parallel to one edge of each of said plurality of notes.

5. The method of claim 3 wherein each of said plurality of notes is generally rectangular in shape and said predetermined path is substantially parallel to one of the short edges of each of said plurality of notes.

6. The method of claim 1, further comprising the step of generating a counterfeit note signal in response to one of said plurality of notes having authenticity data outside said sensitivity levels, said counterfeit signal being sent to said remotely located host from said note counting device.

7. The method of claim 1, wherein said step of generating authenticity data includes the steps of:

exposing each of said plurality of notes to optical energy; and determining a sensed optical energy value corresponding to the amount of optical energy received from each of said plurality of notes.

8. The method of claim 7, wherein said sensed optical energy value corresponds to UV energy reflected from each of said plurality of notes.

9. The method of claim 7, wherein said sensed optical energy value corresponds to fluorescent energy emitted from each of said plurality of notes.

10. The method of claim 1, wherein said sensitivity level includes a magnetic sensitivity level and an optical sensitivity level.

11. The method of claim 10, wherein said step of setting said sensitivity level only sets one of said magnetic sensitivity level and said optical sensitivity level.

12. The method of claim 1, further including the step of altering a default sensitivity level within said note counting device for detecting overlapping notes.

13. The method of claim 1, wherein said remotely located host is a cash settlement machine.

14. The method of claim 13, wherein said cash settlement machine is a personal computer.

15. A method of detecting counterfeit currency in a document handling device, said document handling device being coupled to a host that is remotely located from said document handling device, said document handling device and said remotely located host being controlled by an operator, the method comprising the steps of:
   (a) determining a denomination of a plurality of notes to be counted by said document handling device;
   (b) setting a default sensitivity level for said denomination of said plurality of notes;
   (c) instructing, under the command of said operator, said remotely located host to send a signal to said document handling device to change said default sensitivity level for said denomination to a modified sensitivity level;
   (d) generating authenticity data from each of said plurality of notes; and
   (e) comparing said authenticity data with said modified sensitivity level to determine whether each of said plurality of notes is genuine.

16. The method of claim 15 wherein said step of generating authenticity data includes the step of determining a checksum corresponding to the concentration of magnetic ink on each of said plurality of notes.

17. The method of claim 16 wherein said step of generating a checksum corresponding to the concentration of magnetic ink on said note comprises the substeps of:
   (a) magnetically scanning along a predetermined path on each of said plurality of notes;
   (b) measuring magnetic concentration at a plurality of data points along said predetermined path, each of said data points having a value that corresponds to the concentration of magnetic ink; and
   (c) generating said checksum by adding said value of magnetic concentration at each of said data points.

18. The method of claim 17 wherein said note is generally rectangular in shape and said predetermined path is substantially parallel to one of the short edges of said note.

19. The method of claim 15 wherein said document handling device is a note counting device.

20. The method of claim 19 wherein said step of setting a default sensitivity level includes the step of entering said denomination of said plurality of notes at said remotely located host, and sending said note counting device from said remotely located host a denomination signal corresponding to said denomination of said plurality of notes.

21. The method of claim 15, wherein said step of generating authenticity data includes the steps of:
   exposing each of said plurality of notes to optical energy; and
   determining a sensed optical energy value corresponding to the amount of optical energy received from each of said plurality of notes.

22. The method of claim 21, wherein said sensed optical energy value corresponds to UV energy reflected from each of said plurality of notes.

23. The method of claim 21, wherein said sensed optical energy value corresponds to fluorescent energy emitted from each of said plurality of notes.

24. The method of claim 15, wherein said sensitivity level includes a magnetic sensitivity level and an optical sensitivity level.

25. The method of claim 15, wherein said step of setting said sensitivity level only sets one of said magnetic sensitivity level and said optical sensitivity level.

26. The method of claim 15, further including the step of altering a default sensitivity level within said note counting device for detecting overlapping notes.

27. The method of claim 15, further including the step of altering a default sensitivity level based on a series of said denomination.

28. The method of claim 15, wherein said step of determining a denomination is accomplished automatically via said document handling device.

29. A method of detecting counterfeit currency in a note counting device, said note counting device being coupled to a host that is remotely located from said note counting device, said note counting device and said remotely located host being controlled by an operator, the method comprising the steps of:
   (a) determining a series and denomination of a plurality of notes to be counted by said note counting device;
   (b) entering, under the command of said operator, said series and denomination of said plurality of notes at said remotely located host;
   (c) instructing, under the command of said operator, said remotely located host to send at least one signal to said note counting device to establish said series and denomination that is to be counted;
   (d) setting a sensitivity level within said note counting device corresponding to said series and denomination of said plurality of notes associated with said signal;
   (e) generating authenticity data from each of said plurality of notes; and
   (f) comparing said authenticity data with said sensitivity level to determine whether each of said plurality of notes is genuine.

30. An apparatus for detecting counterfeit currency, comprising:
   a microprocessor;
   means for storing a plurality of sensitivity levels to be used in detecting a counterfeit note from a plurality of notes;
   means for scanning said note along a predetermined path to obtain authenticity data values for each of said plurality of notes;
   means associated with said microprocessor for comparing said authenticity data values to one of said plurality of sensitivity levels;
   means for indicating whether said authenticity data value for each of said plurality of notes is within a predetermined range of said one of said plurality of sensitivity levels; and
   means associated with said microprocessor for receiving at least two external signals from a host system, one of said external signals is for establishing said one of said plurality of sensitivity levels, the other of said external signals is for establishing which denomination of currency is to be processed, said host system being remotely located from said counterfeit currency detection apparatus such that said sensitivity levels can be selected by an operator of said host system who is at a remote position from said counterfeit currency detection apparatus, said comparing means being operable in response to said microprocessor receiving said one of said external signals.

31. The apparatus of claim 30 in combination with said host system and a communication line connecting said counterfeit currency detection apparatus with said host system, said communication line transmitting said at least two external signals.

32. The apparatus of claim 30 further including means for determining the denomination of each of said plurality of notes.

33. The apparatus of claim 30 wherein said scanning means is a magnetic scanning device.

34. The apparatus of claim 30 wherein said scanning means is an optical scanning device having a light source for illuminating a strip of a preselected segment of said note.

35. An apparatus for detecting counterfeit currency, comprising:
  a microprocessor;
  a memory device coupled to said microprocessor for storing a plurality of sensitivity levels to be used in detecting a counterfeit note from a plurality of notes;
  a scanning mechanism to detect authenticity characteristics for each of said plurality of notes;
  means associated with said microprocessor for comparing said authenticity characteristics to one of said plurality of sensitivity levels; and
  an electrical port being connected to said microprocessor and for coupling said apparatus to a host system that is remotely located from said counterfeit currency detection apparatus, said electrical port receiving at least one external signal from said remotely located host system establishing said one of said plurality of sensitivity levels and sending a counterfeit signal to said remotely located host system in response to said authenticity characteristics being outside said one of said plurality of sensitivity levels, said one of said plurality of sensitivity levels being selectable by an operator of said remotely located host system and, in response thereto, said remotely located host system producing said at least one external signal received at said electrical port.

36. The apparatus of claim 35 wherein said at least one external signal includes a signal for establishing a denomination of said plurality of notes that are to be processed.

37. The apparatus of claim 35 further including a second scanning mechanism for determining the denomination of each of said plurality of notes.

38. The apparatus of claim 35 wherein said scanning mechanism is a magnetic scanning device.

39. The apparatus of claim 35 wherein said scanning mechanism is an optical scanning device having a light source for illuminating a strip of a preselected segment of said note.

40. A cash settlement system for recording and reconciling financial data, comprising:
  a cash settlement machine having a controller, an operator interface panel coupled to said controller, a graphics display coupled to said controller, and at least one electrical port coupled to said controller;
  a document handling device for authenticating and counting a plurality of notes, said document handling device being remotely located from said cash settlement machine and including
    a control means,
    a scanning mechanism to detect authenticity data values for each of said plurality of notes,
    a memory device coupled to said control means for storing a plurality of sensitivity levels to be used in detecting a counterfeit note from said plurality of notes,
    means associated with said control means for comparing said authenticity data values to one of said plurality of sensitivity levels, and
    a second electrical port being coupled to said control means, said electrical port for receiving at least one external signal from said cash settlement machine establishing said one of said plurality of sensitivity levels and for sending a counterfeit signal to said said cash settlement machine in response to said authenticity data values being outside said one of said plurality of sensitivity levels; and
  means for connecting said at least one electrical port of said cash settlement machine to said second electrical port of said document handling device such that an operator of said cash settlement machine who is remotely located from said document handling device can select said one of said plurality of sensitivity levels for detecting counterfeit notes in said document handling device.

41. The cash settlement system of claim 40 wherein said document handling device further includes a second scanning mechanism for determining the denomination of each of said plurality of notes.

42. The method of claim 1, further including the step of depositing said plurality of notes into a hopper of said note counting device as a stack and said step of generating authenticity data includes the step of conveying said plurality of notes from said stack one at a time through said note counting device.

43. The counterfeit currency detecting apparatus of claim 35, further including a hopper for receiving said plurality of notes as a stack, said plurality of notes being conveyed from said stack to said scanning mechanism one at a time.

44. A system for detecting counterfeit currency, comprising:
  a counterfeit currency detection apparatus including a controller having a memory device coupled thereto for storing a plurality of sensitivity levels to be used in detecting a counterfeit note from a plurality of notes, a scanning mechanism to detect authenticity characteristics for each of said plurality of notes, means associated with controller for comparing said authenticity characteristics to one of said plurality of sensitivity levels, and a first electrical port connected to said controller;
  a host system that is external to said counterfeit currency detection apparatus, said host system including means for selecting one of said plurality of sensitivity levels, means for producing a signal corresponding to a selected one of said plurality of sensitivity levels, and a second electrical port for transmitting said signal externally from said host system; and
  a communication line between said first electrical port and said second electrical port for transmitting said signal from said host system to said counterfeit currency detection apparatus.

* * * * *